United States Patent
Maguire et al.

(10) Patent No.: US 6,996,092 B1
(45) Date of Patent: Feb. 7, 2006

(54) IP-BASED BASE STATION SYSTEM

(75) Inventors: Patrick Maguire, Ballinamore (IE); Niilo Musikka, Bromma (SE); Torsten Nilsson, Hästveda (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 768 days.

(21) Appl. No.: 09/686,502

(22) Filed: Oct. 11, 2000

Related U.S. Application Data

(60) Provisional application No. 60/179,365, filed on Jan. 31, 2000.

(51) Int. Cl.
*H04J 3/16* (2006.01)
*H04J 3/22* (2006.01)
*H04Q 7/20* (2006.01)
*G06F 15/173* (2006.01)

(52) U.S. Cl. .............. 370/356; 370/329; 370/465; 455/423; 455/453; 709/238

(58) Field of Classification Search ........ 370/235–338, 370/352, 349–369, 310, 337, 347, 465–469, 370/474, 395–399; 455/423–437, 456, 445, 455/452–458, 517, 422, 525–556, 502–505; 709/203–209, 220–223, 233–238
See application file for complete search history.

(56) References Cited

U.S. PATENT DOCUMENTS

| | | | | |
|---|---|---|---|---|
| 5,960,004 | A * | 9/1999 | Ramstrom et al. | 370/469 |
| 6,157,946 | A * | 12/2000 | Itakura et al. | 709/217 |
| 6,292,891 | B1 * | 9/2001 | Bergenwall et al. | 713/151 |
| 6,317,421 | B1 * | 11/2001 | Wilhelmsson et al. | 370/328 |
| 6,366,961 | B1 * | 4/2002 | Subbiah et al. | 709/238 |
| 6,493,559 | B1 * | 12/2002 | Pecen et al. | 455/466 |
| 6,515,997 | B1 * | 2/2003 | Feltner et al. | 370/401 |
| 6,519,458 | B2 * | 2/2003 | Oh et al. | 455/445 |
| 6,529,525 | B1 * | 3/2003 | Pecen et al. | 370/469 |
| 6,556,820 | B1 * | 4/2003 | Le et al. | 455/411 |
| 6,578,082 | B1 * | 6/2003 | Ho et al. | 709/233 |
| 6,631,259 | B2 * | 10/2003 | Pecen et al. | 455/426.1 |
| 6,665,537 | B1 * | 12/2003 | Lioy | 455/435.1 |
| 6,678,281 | B1 * | 1/2004 | Chakrabarti et al. | 370/438 |
| 6,687,226 | B1 * | 2/2004 | Galyas | 370/231 |
| 6,704,311 | B1 * | 3/2004 | Chuah et al. | 370/389 |
| 6,711,143 | B1 * | 3/2004 | Balazinski et al. | 370/329 |
| 6,711,166 | B1 * | 3/2004 | Amir et al. | 370/395.1 |
| 6,717,925 | B1 * | 4/2004 | Leppisaari et al. | 370/312 |
| 6,785,287 | B1 * | 8/2004 | Honkala et al. | 370/401 |
| 6,792,270 | B1 * | 9/2004 | Neumann | 455/432.1 |
| 6,898,425 | B1 * | 5/2005 | Wilhelmsson et al. | 455/423 |

(Continued)

FOREIGN PATENT DOCUMENTS

EP  1 033 893   9/2000

(Continued)

OTHER PUBLICATIONS

Buitenwerf, E. et al.: RACE Monet: mobile networks for UMTS); Proceedings of the 2nd IEEE International Conference on Universal Personal Communications, IEEE ICUPC'93, Oct. 1993; pp. 381-386.

(Continued)

*Primary Examiner*—M. Phan

(57) ABSTRACT

A Base Station System (BSS) infrastructure is provided which is based on an IP or packet-based, connection-less protocol. Notably, the BSS disclosed can be implemented for any IP-based Radio Access Network, and in particular (but not exclusively), can be implemented for GSM and TDMA systems, including those with GPRS/EDGE applications.

21 Claims, 4 Drawing Sheets

U.S. PATENT DOCUMENTS

| | | | |
|---|---|---|---|
| 6,920,116 B1 * | 7/2005 | Hossain et al. | 370/329 |
| 2001/0030941 A1 * | 10/2001 | Musikka et al. | 370/221 |
| 2002/0015392 A1 * | 2/2002 | Musikka et al. | 370/331 |

FOREIGN PATENT DOCUMENTS

| | | |
|---|---|---|
| WO | WO 99 35800 | 7/1999 |
| WO | WO 00/08803 | 2/2000 |
| WO | WO 00/11849 | 3/2000 |

OTHER PUBLICATIONS

Musikka, N. et al.: "Ericsson's IP-based BSS and Radio Netwerk Server"; Ericsson Review, No. 4, 2000, pp. 224-233.

PCT International Search Report for PCT/SE 01/00101 mailed Jul. 13, 2001.

* cited by examiner

IP-BASED BASE STATION SYSTEM

This application claims the benefit of U.S. Provisional Ser. No. 60/179,365 filed Jan. 31, 2000.

BACKGROUND OF THE INVENTION

1. Technical Field of the Invention

The present invention relates in general to the mobile communications and Internet fields and, in particular, but not exclusively, to an Internet Protocol (IP)-based Base Station System (BSS) architecture for General Packet Radio Service/Enhanced Data Rates for Global Evolution (GPRS/EDGE) applications.

2. Description of the Prior Art

FIG. 1 is a block diagram of an existing BSS architecture for the GPRS. Referring to FIG. 1, the GPRS BSS includes a Radio Base Station (RBS) 10. The RBS includes a Channel Control Unit (CCU) 12. The RBS is connected to a Base Station Controller/Transcoder Controller (BSC/TRC) 14. The BSC includes a Packet Control Unit (PCU) 16. Notably, the PCU can also be located in the RBS 10. The BSC 14 is connected to a Serving GPRS Support Node (SGSN) 18. An Operations and Support System (OSS) 20 is connected to the BSC 14.

FIG. 2 is a block diagram of an IP-based BSS 200, which has been developed by Ericsson. A more detailed description of such an IP-based BSS is disclosed in the above-described commonly-assigned, co-pending U.S. Application for patent Ser. No. 09/494,606, the entire disclosure of which is incorporated herein by reference.

Referring to FIG. 2, the IP-based BSS 200 can include three types of nodes connected to an IP network 208. A mobile station 222 is connected to a Radio Base station 202, which is connected to the IP network 208. In general, the RBS 202 functions similarly to existing RBSs used for implementing a GSM model. Moreover, the RBS 202 also provides IP support for the BSS 200. For example, the RBS 202 functions as an IP host and can include an IP router (not shown). The IP router can be used to route payload User Datagram Protocol (UDP) datagrams to one or more Transmitter/Receivers (TRXs) and also for connecting a plurality of RBSs in various topologies.

A second node connected to the IP network 208 is a GateWay (GW) 204, which is then connected to MSC 218 and SGSN 220. The GW 204 can be used to terminate the A-interface. Also, the GW 204 can perform a conversion from one protocol (e.g., SS7 protocol) to another protocol (e.g., Transmission Control Protocol (TCP)/IP). The GW 204 can also include a Media GW (MGW) which functions similarly to existing TRCs used for implementing a GSM model. The MGW (not shown) includes a pool of Transcoder/Rate Adaptor (TRA) devices (not shown), which, when allocated, are connected to the A-interface. However, the IP network (e.g., GSM) side of the TRAs in the MGW are connected to respective UDP ports. Preferably, the GW 204 is connected to the IP network 208 via a separate router (not shown).

A third node connected to the IP network 208 is a Radio Network Server (RNS) 206. The RNS 206 functions similarly to a BSC used for implementing a GSM model. A primary difference between the RNS 206 and a BSC is that the RNS does not switch payloads and does not include a Group Switch (GS). As such, the RNS 206 preferably carries signalling only, and includes a pool of processors (e.g., the number of processors determined by capacity requirements). The RNS 206 provides a robust, general purpose distributed processing environment, which can be based on a standard operating system such as, for example, SUN/Solaris™. The 206 can serve one or more logical BSCs and is preferably connected to the IP network 208 via a separate router. As such, the payload can be routed directly between the GW 204 and RBS 202, without passing through the RNS' 206 processors. The A-interface signalling is routed between the RNS 206 and GW 204.

The EDGE standard has been developed for a Time Division Multiple Access (TDMA) packet data system based on the GPRS technology. Essentially, the EDGE technology has been developed to provide an evolutionary path for GSM and TDMA operators to more effectively use the so-called $3^{rd}$ Generation System's services, by building on the existing GPRS network infrastructure and radio air interface. EDGE technology is being developed to support best effort packet data transmissions at data rates of up to about 384 kbps, and Voice over Internet Protocol (VoIP) functionality.

In one approach being considered for an existing BSS, the PCU was to be located in the BSC (e.g., such as shown in FIG. 1). The reason for following this approach was because, at the time, it was the most effective way to introduce GPRS into the available BSS technology. As such, with the STM-connected RBSs in use at the time, which supported data rates of only 16 kb/s for each radio air timeslot, not many other options were available.

In another approach being considered for an IP-based BSS, the decision made was to locate the PCU in the RBS. The reasons set forth for this approach were as follows: higher transmission efficiencies could be attained, because the LLC frames could be treated as low priority packets in the transmission network; transmission network dimensioning could be accomplished easier than before, because peak allocations would not be needed, resulting in less transmission bandwidth needed; no synchronization protocol would be needed over the transmission network between the Radio Link Control/Medium Access Control (RLC/MAC) and CCU; lower signalling overhead would be needed; the lowest possible round-trip delay would occur, which would create no risk in stalling the RLC/MAC protocol used; there would be no risk in having to retransmit RLC/MAC blocks over the transmission network because of the ARQ approach used; and Moore's Law would make the manufacturing cost impact on the RBS much lower over time.

Subsequently, a number of drawbacks to the above-described approach for an IP-based BSS (to locate the PCU in the RBS) were recognized. First, the task of configuring the Network Service-Virtual Connection (NS-VC) on the Gb interface would have to be performed manually. As such, instead of having only one Gb interface to configure (as in the earlier approach), hundreds to thousands of Gb interfaces to the SGSN would have to be configured manually. This problem is especially significant since a primary objective of the IP-based BSS is to provide an effective plug-and play environment. Another drawback of the above-described approach is that a "Flush" function only works within one PCU. As such, when a Mobile Station (MS) performs a cell re-selection, the queue can be moved to the new RBS, but only within one PCU. With a PCU in the RBS, the queue would be discarded if the MS were to make a cell re-selection to a cell in another RBS with subsequent performance hits.

Another drawback of the above-described approach of locating the PCU in the RBS is that this approach hinders the development of a point-to-multipoint environment. In other words, one of the more important functions foreseen for an IP-based BSS is one that broadcasts information to groups of mobiles, so that it is beneficial to have a broad view of the BSS network. As such, the multi-point broadcast function should be centrally located, which is an impractical approach when the PCU is located in the RBS.

Still another drawback of the above-described approach is that it hinders the possibility of optimizing paging functions. In other words, the paging distribution function can be seen as being primarily a radio network function and not an SGSN function. If the approach was better able to take advantage of the knowledge about mobiles inside the Radio Access Network, the paging functions could be better optimized.

Notably, an important consideration for an IP-based BSS is that a GW device is needed for a number of reasons. For example, a GW can function as an anchor point for a handover. As such, in a system with real-time services (e.g., speech), such an anchor point is needed for handover at the ingress to the BSS. Next, a GW can function as the border of an administrative domain. Moreover, even if the Core Network in a system is also an IP network, a device such as a GW is needed as a delimiter for administrative purposes (e.g., assignment of IP addresses). Additionally, a GW can function for payload formatting and encryption conversions or terminations. As such, the payload formats and encryption methods can vary in Core Networks depending on the vendor. Also, a GW can enhance Quality of Service (QoS) mapping. For example, an IP-based BSS could be using Differentiated Services (Diff Serv) applications (e.g., as defined in IETF RFC 2475, "An Architecture for Differentiated Services"), and the Core Network could be using another type of service. Consequently, a GW could be used to map the QoS from one service to the other. Even if the Core Network also uses Diff Serv applications, the Core Network could also use another type of mapping of services to code points, for example. In other words, a GW provides the freedom for an operator to use different mappings.

Moreover, a GW can enhance the pricing of the bit-pipe from the SGSN. For example, one idea being considered for marketing GPRS is to price the peak rate for the pipe from the SGSN. This function would be extremely difficult to perform without a GW. Also, a GW would allow an operator to configure the links from the SGSN and MSC so as to keep the number of such links to a minimum. Finally, a GW could be provided for transcoding and signalling for backwards compatibility with the A- and Gb-interfaces.

For all of the above-described reasons, a new architecture for GPRS/EDGE applications in a BSS is needed (for GSM and TDMA systems). As described in detail below, the present invention provides such an architecture which successfully resolves the above-described problems and other related problems.

SUMMARY OF THE INVENTION

In accordance with a preferred embodiment of the present invention, a BSS infrastructure is provided which is based on an IP or packet-based, connection-less protocol. Notably, the present invention can be implemented for any IP-based Radio Access Network, and in particular (but not exclusively), can be implemented for GSM and TDMA systems, including those with GPRS/EDGE applications.

An important technical advantage of the present invention is that a BSS architecture is provided whereby the infrastructure is packet-switched with a connection-less orientation.

Another important technical advantage of the present invention is that a BSS architecture is provided whereby circuit-switched and packet-switched services traffic can be mixed.

Still another important technical advantage of the present invention is that a BSS architecture is provided whereby the mixing of speech and data traffic is particularly efficient.

Still another important technical advantage of the present invention is that the architecture that can be implemented is in conformance with 3rd Generation Radio Access Network specifications.

Still another important technical advantage of the present invention is that the architecture that can be implemented can facilitate the use of plug 'n play applications.

Yet another important technical advantage of the present invention is that the architecture that can be implemented can facilitate network planning (e.g., IP can route data via alternative paths if failures should occur.

Still another important technical advantage of the present invention is that the architecture that can be implemented can facilitate making changes to the network, because no switching is performed in the RNS.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–6 of the drawings, like numerals being used for like and corresponding parts of the various drawings.

Essentially, in accordance with a preferred embodiment of the present invention, a BSS infrastructure is provided which is based on an IP- or packet-based, connection-less protocol. Notably, the present invention can be implemented for any IP-based Radio Access Network, and in particular (but not exclusively), can be implemented for GSM and TDMA systems, including those with GPRS/EDGE applications.

Figure 1:
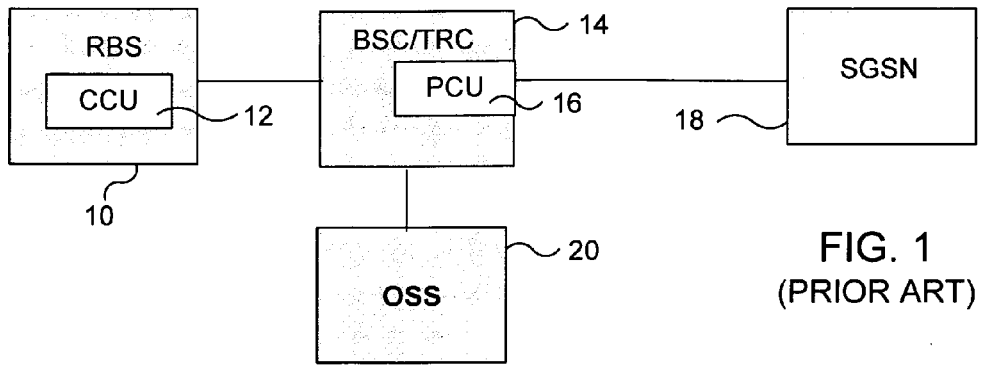
FIG. 1 is a block diagram of an existing BSS architecture for a GPRS system.
Figure 2:
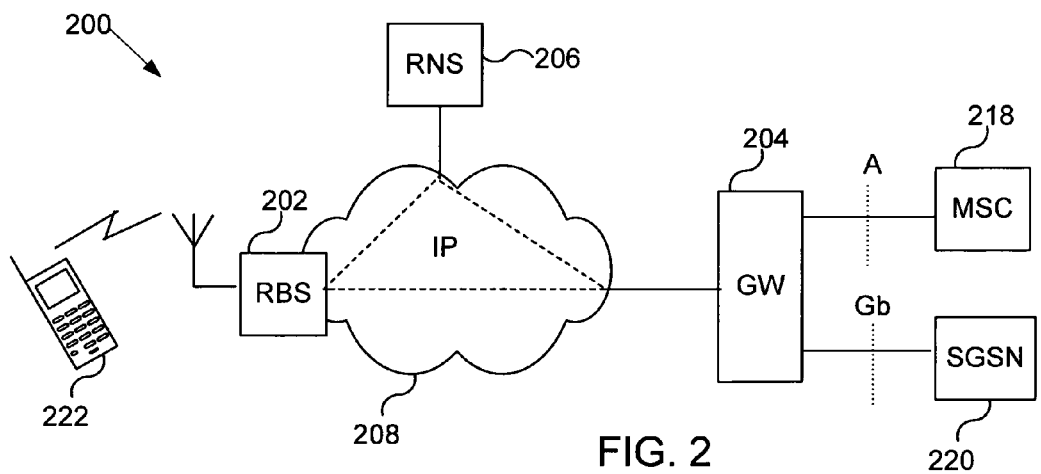
FIG. 2 is a block diagram of an IP-based BSS, which has been developed by Ericsson.
Figure 3:
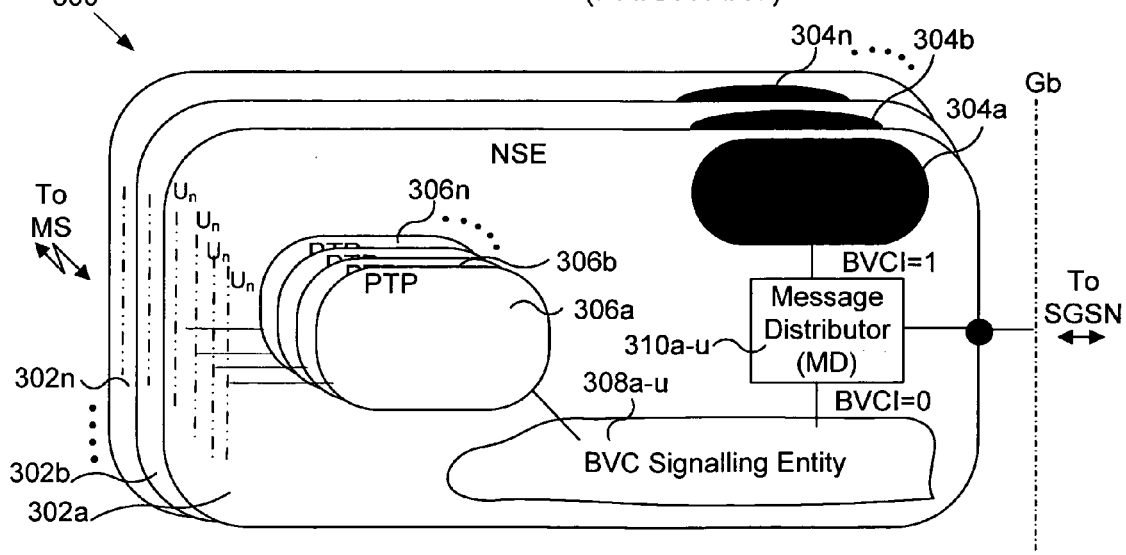
FIG. 3 is a block diagram of an exemplary logical architecture for one or more Network Service Entities (NSEs), which can be used to implement an IP-based BSS in accordance with the preferred embodiment of the present invention.

Specifically, FIG. 3 is block diagram of an exemplary logical architecture 300 for one or more NSEs, which can be used to implement an IP-based BSS in accordance with the preferred embodiment of the present invention. For this embodiment, the architecture 300 shown is described preferably for implementation in an IP-based BSS for GPRS/EDGE applications. However, it should be understood that the present invention is not intended to be so limited, and can be implemented in a BSS or similarly functioning apparatus in any appropriate mobile communications network (e.g., GSM, GPRS, TDMA, CDMA network).

Referring to FIG. 3, it can be assumed that the Gb-interface shown provides an appropriate interface between an SGSN (not explicitly shown) and a BSS (not explicitly shown). Also, the Um-interface (s) shown provide(s) an appropriate radio air interface between the BSS and one or more MSs (not explicitly shown). The BSS includes at least one NSE (e.g., for the purposes of this description, an NSE is functionally similar to a PCU). For this exemplary embodiment, a plurality of NSEs 302a–n is shown. Each such NSE can include a Point-to-Multipoint Functional Entity 304a–n, a plurality of Point-to-Point Functional Entities 306a–n (e.g., one per cell in an NSE), a BSS GPRS Protocol (BSSGP) Virtual Connection (BVC) Signalling Functional Entity 308a–n, and a Message Distributor Functional Entity 310a–n.

Each Point-to-Multipoint Functional Entity (e.g., 304a) functions to handle connections between multiple endpoints and is preferably centrally located in the BSS. For example, a Point-to-Multipoint Functional Entity can be located in a GW, RNS, or any other appropriately located network element. For this exemplary embodiment, each Point-to-Point Functional Entity 306a–n includes an RLC/MAC, and therefore, is preferably located in the RBS (not explicitly shown) for performance reasons. A respective Transceiver (TRX) channel couples a Point-to-Point Functional Entity to a radio air interface, Um. Each BVC Signalling Functional Entity 308a–n handles the BVC management and paging functions for the NSE involved. If a BSS is configured to include only one NSE, the BVC Signalling Functional Entity is preferably centrally located in the BSS (e.g., in the RNS). In order to be able to distribute the above-described Functional Entities across different network elements, each Message Distributor Functional Entity 310a–n is capable of distributing BVCI-based BSSGP packets to the different network elements. Preferably, each Message Distributor Functional Entity is located at the ingress of the Gb-interface to the BSS.

Figure 4:
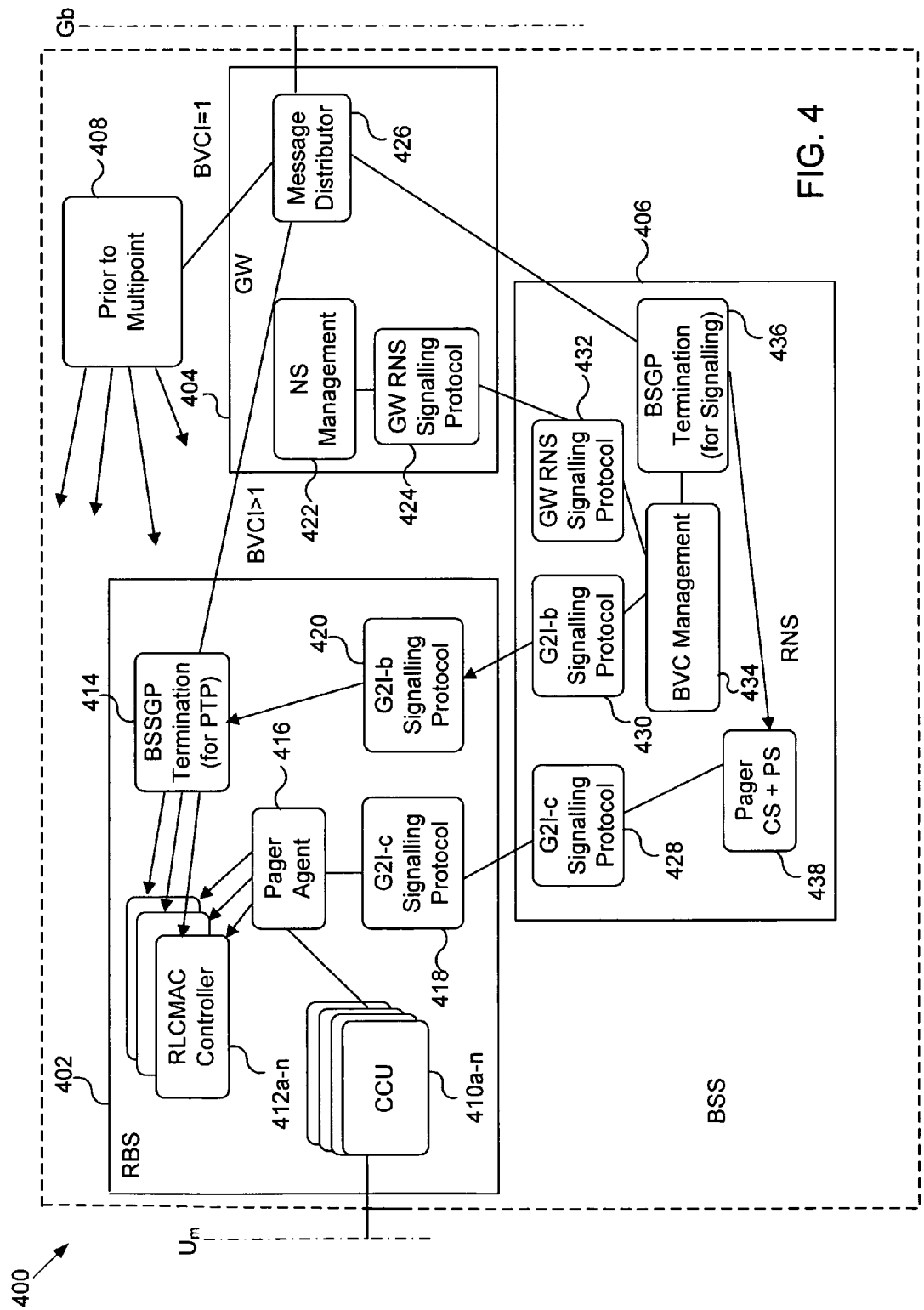
FIG. 4 is a block diagram of an exemplary functional distribution for an IP-based BSS (Gb on a Frame Relay (FR)), which can be implemented in accordance with the preferred embodiment of the present invention.

FIG. 4 is a block diagram of an exemplary functional distribution for an IP-based BSS 400 (Gb on FR), which can be implemented in accordance with the preferred embodiment of the present invention. Again, the exemplary functional distribution shown is described preferably for implementation in an IP-based BSS for GPRS/EDGE applications. However, it should be understood that the present invention is not intended to be so limited, and can be implemented in a BSS or similarly functioning entity in any appropriate mobile communications network (e.g., GSM, GPRS, TDMA, CDMA network).

Referring to FIG. 4, the exemplary BSS 400 can include an RBS 402, a GW 404, an RNS 406, and a Point-to-Multipoint Functional Entity 408. The RBS 402 shown includes a plurality of CCUs 410a–n, each of which functions to control RF modulation and channel coding. The RBS also includes a plurality of RLC/MAC controller units 412a–n, each of which functions herein preferably as a Point-to-Point Functional Entity. A BSSGP Termination unit 414 functions to terminate BSSGP connections for point-to-point connections (e.g., 412a–n). The BSSGP Termination unit 414 is coupled to the RNS 406 via a G21-b Signalling Protocol (420, 430). A Pager Agent unit 416 functions to distribute page commands to all cells within the RBS. The Pager Agent unit 416 is coupled to the Pager Unit 438 in the RNS 406 via a G21-c Signalling Protocol (418, 428).

The GW 404 shown includes a Network Service (NS) Management Functional Entity 422. The NS Management Functional Entity 422 is coupled to the RNS 406 via a GW-RNS Signalling Protocol (424, 432). The GW 404 also includes a Message Distributor Functional Entity 426, which functions to distribute BVCI-based BSSGP packets to different network elements. The Message Distributor Functional Entity 426 is coupled via the Gb-interface to the SGSN (not explicitly shown), and to a Point-to-Multipoint Functional Entity 408, which functions to provide a connection to multiple endpoints. The Message Distributor Functional Entity 426 is also coupled to the BSSGP Termination Functional Entity 414 in the RBS 402.

The RNS 406 includes a BVC Management Functional Entity 434. The BVC Management Functional Entity 434 is coupled to the BSSGP Functional Entity 414 in the RBS 402 via the G21-b Signalling Protocol (420, 430), and to the NS Management Functional Entity 422 in the GW 404 via the GW-RNS Signalling Protocol (424, 432). The NS Management Functional Entity 422 is also coupled to a BSSGP Termination unit 436, which functions to terminate BSSGP signalling connections. The RNS 406 also includes a Pager unit 438, which functions to distribute Page commands to all RBSs within the Location Area, Routing Area, or BSS Area involved. The Pager unit 438 is coupled to the Pager Agent unit 416 in the RBS 402 via the G21-c Signalling Protocol, and to the BSSGP Termination Functional Entity 436 in the RNS 406.

In operation, referring to FIG. 4, if the BSS 400 is to support the A-interface or Gb-interface on a frame relay (FR), then it is preferable to include a network element that can convert the A- and Gb-interfaces to IP. However, if the BSS 400 is to support only GPRS applications, then with a Gb-interface on an IP (e.g., described in detail below), the Message Distributor 426 can be used. As mentioned earlier, the Message Distributor 426 can be located in one of a number of places, such as, for example, in the GW 404, the RNS 406, or the SGSN (not explicitly shown). The advantages of locating the Message Distributor in the GW have been described above. The primary disadvantage of locating the Message Distributor in the GW is that this approach adds another network element with cost and availability issues that need to be resolved. However, this problem can be resolved to a certain extent by using an AXE Digital Switching System (manufactured by Ericsson) as the GW for an IP-BSS.

If the Message Distributor were to be located in the RNS 406, the entire data stream from the SGSN could be conveyed through the RNS backplane. This approach would be acceptable for relatively small loads from the SGSN or for relatively small systems, but not acceptable for large systems. The Message Distributor can also be located in an SGSN. Such an approach is described below with respect to FIG. 5.

The NS Management Functional Entity 422 is used where the NS layer of the Gb-interface is terminated (e.g., in the GW). NS status reports are forwarded to the BVC Management Functional Entity 434 in the RNS 406. If the link to the SGSN fails (e.g., a hardware failure), the NS Management Functional entity 422 reports this failure to the BVC Management Functional Entity 434 in the RNS, in order to block operation of the Point-to-Point Functional Entities (e.g., 412a–n) in all of the RBSs involved. The GW-RNS Signalling Protocol (424, 432) is used to convey the failure signalling message (separate from the BSSGP signalling) from the NS Management Functional Entity 422 to the BVC Management Functional Entity 434. In response, the BVC Management Functional Entity 434 conveys a message to the BSSGP Termination Functional Entity 414 in the RBS 402 via the G21-b interface (using the G21-b Signalling Protocol 420, 430), in order to block operation of the Point-to-Point Functional Entities (412a–n).

Figure 5:
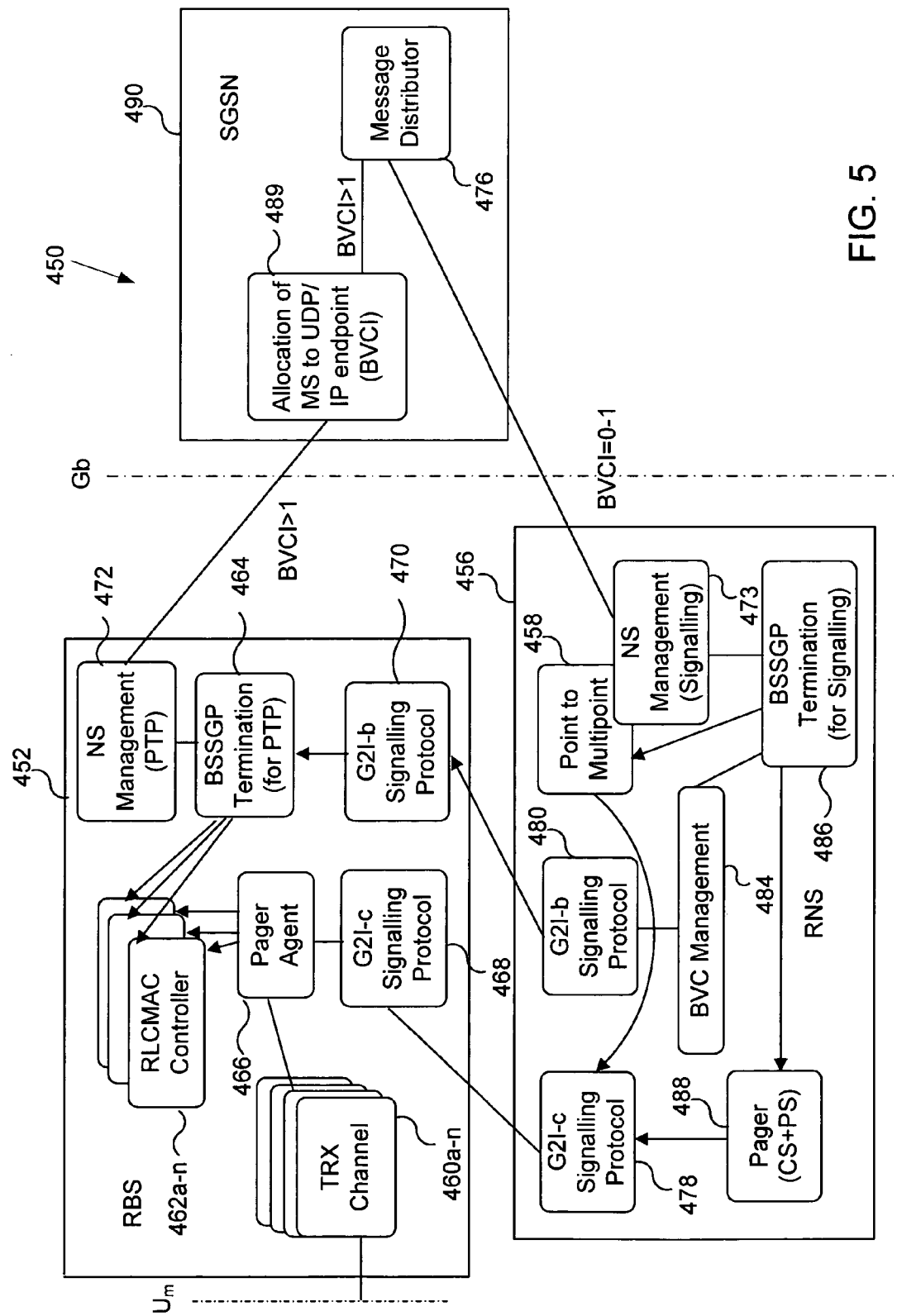
FIG. 5 is a block diagram of an exemplary functional distribution for an IP-based BSS (Gb on an IP), which can be implemented in accordance with the preferred embodiment of the present invention.

FIG. 5 is a block diagram of an exemplary functional distribution for an IP-based BSS 400 (Gb on IP), which can be implemented in accordance with the preferred embodiment of the present invention. For this exemplary embodiment, the Gb over IP protocol being implemented in accordance with the present invention, includes functionality to distribute signalling messages to the NS Management Functional Entity in the RNS, and point-to-point messages to the NS Management Functional Entity in the RBS. In this case, a Message Distributor is not needed in the BSS. One possible implementation in the SGSN is shown in FIG. 5. Again, the exemplary functional distribution shown is described preferably for implementation in an IP-based BSS for GPRS/EDGE applications. However, it should be understood that the present invention is not intended to be so limited, and can be implemented in a BSS or similarly functioning entity in any appropriate mobile communications network (e.g., GSM, GPRS, TDMA, CDMA network).

Referring to FIG. 5, the exemplary BSS 450 includes an RBS 452, and an RNS 456. The RBS 452 shown includes a plurality of CCUs 460a–n, each of which functions to control RF modulation and channel coding. The RBS also includes a plurality of RLC/MAC controller units 462a–n, each of which functions herein preferably as a Point-to-Point Functional Entity. A BSSGP Termination unit 464 functions to terminate BSSGP connections for point-to-point connections. The BSSGP Termination unit 464 is coupled to the RNS 456 via a G21-b Signalling Protocol (470, 480). A Pager Agent unit 466 functions to distribute page commands to all cells within the RBS. The Pager Agent unit 466 is coupled to the Pager Unit 488 in the RNS 456 via a G21-c Signalling Protocol (468, 478). The RBS 452 also includes an NS Management Functional Entity 472. The NS Management Functional Entity 472 is coupled to the SGSN 490 via the Gb over IP Signalling Protocol.

The SGSN 490 includes a Message Distributor Functional Entity 476, which functions to distribute BVCI-based BSSGP packets to the different network elements. The Message Distributor Functional Entity 476 is coupled to a control unit 489, which can distribute BSSGP packets based on MS identity to appropriate UDP/IP endpoints, and to an NS Management Functional Entity (for signalling functions) 473 in the RNS 456. The control unit 489 is coupled via the Gb-interface to the NS Management Functional Entity (for PTP functions) 472 in the RBS 452.

The RNS 456 includes a BVC Management Functional Entity 484. The BVC Management Functional Entity 484 is coupled to the BSSGP Functional Entity 464 in the RBS 452 via the G21-b Signalling Protocol (470, 480), and to a BSSGP Termination unit 486, which functions to terminate BSSGP signalling connections. The RNS 456 also includes a Pager unit 488, which functions to distribute Page commands to all RBSs within the Location Area, Routing Area, or BSS Area involved. The Pager unit 488 is coupled to the Pager Agent unit 466 in the RBS 452 via the G21-c Signalling Protocol, and to the BSSGP Termination Functional Entity (for signalling functions) 486 in the RNS 456.

In operation, referring to FIG. 5, for this aspect of the invention, the BSS 450 can be used to support only GPRS applications, and with the Gb-interface on IP, the Message Distributor 476 can be located in the SGSN. The NS Management Functional Entity 472 is used where the NS layer of the Gb-interface is terminated (e.g., in the RBS). NS status reports are forwarded to the BVC Management Functional Entity 484 in the RNS 456. If the link to the SGSN fails (e.g., a hardware failure), the NS Management Functional entity 472 reports this failure to the BVC Management Functional Entity 484 in the RNS, in order to block operation of the Point-to-Point Functional Entities (e.g., 462a–n) in the RBS involved. The G21b Signalling Protocol can be used to convey the failure signalling message (separate from BSSGP signalling) from the NS Management Functional Entity 472 to the BVC Management Functional Entity 484. In response, the BVC Management Functional Entity 484 conveys a message to the BSSGP Termination Functional Entity 464 in the RBS 452 via the G21-b interface (using the G21-b Signalling Protocol 470, 480), in order to block operation of the Point-to-Point Functional Entities (462a–n).

An important aspect of the preferred embodiment is the use of a Message Distributor function to distribute other functional entities in the BSS over different network elements. In other words, for the exemplary embodiment described above with respect to FIGS. 3, 4 and 5, a Message Distributor function (e.g., 426 or 476) is capable of distributing BVCI-based BSSGP packets to the different network elements involved. For example, the Message Distributor 426 or 476 reads the BVCI of each packet received from or at the SGSN and, from a local table, reads the corresponding IP address and port number associated with each such BVCI. For the BVC Signalling Functional Entity 308a–n (received packets with BVCI=0), the Message Distributor 426 or 476 sends all messages to the RNS 406 or 456. For each received packet with a BVCI>1, the Message Distributor 426 sends the packet to the corresponding RBS 402 or 452. This approach routes the received packets relatively efficiently, because all payloads and signalling pass through the Message Distributor.

The above-described BVCI-to-IP address/port table can be built in the Message Distributor 426 by using a "plug 'n play" type application. An exemplary method that can be used for building such a table is that when a cell having a BVCI>1 (e.g., cell supporting packet) is configured, the associated IP address and port number for payload messages are reported to the Message Distributor 426 or 476. Each BVCI and related address/port can thus be associated with the other via the table. The IP address to the Message Distributor can be determined by use of a appropriate service, such as, for example, "Naming Services".

Returning for the moment to FIG. 4, a relatively reliable protocol is needed to convey information from the GW 404 to the RNS 406. If the BSSGP packets (e.g., for packets with a BVCI=0) are terminated in the RNS 406, then the BSSGP can be regarded as an appropriately reliable protocol. However, if packets are not to be terminated in the RNS 406, then a different protocol can be specified for the interface between the GW 404 and the RNS 406. In any event, if the Message Distributor 426 is located in the GW 404, the component of the BSSGP that is to be sent to the BVC Signalling Entity 308a–n needs to be reliably conveyed.

For this exemplary embodiment, as illustrated by FIGS. 3, 4 and 5, it can be assumed that there can be several UDP/IP ports per NSE (PCU). If such a port becomes overloaded, then another NSE can be defined with one or several associated UDP/IP ports. For this approach, the BSS 400 or 450 can be reconfigured so that the RBSs are distributed over these NSEs (PCUs).

As described above, in accordance with the preferred embodiment of the present invention, the PCUs (NSEs) are implemented advantageously in an IP-based BSS (e.g., 400 or 450) with a distributed Gb architecture. As such, with the exemplary architecture described herein for the preferred embodiment, all downlink BSSGP data (from or at the SGSN) is received in the Message Distributor 426 or 476. The Point-to-Point signalling and payload data are routed to the appropriate Point-to-Point BSSGP entity in the associated RBS 402 or 452. Preferably, all other data are forwarded to the RNS 406 or 456. In the uplink direction (toward the SGSN), all BSSGP data are forwarded to the GW 404 Or SGSN 490 from the RBS 402 or 452, or the RNS 406 or 456.

Figure 6:
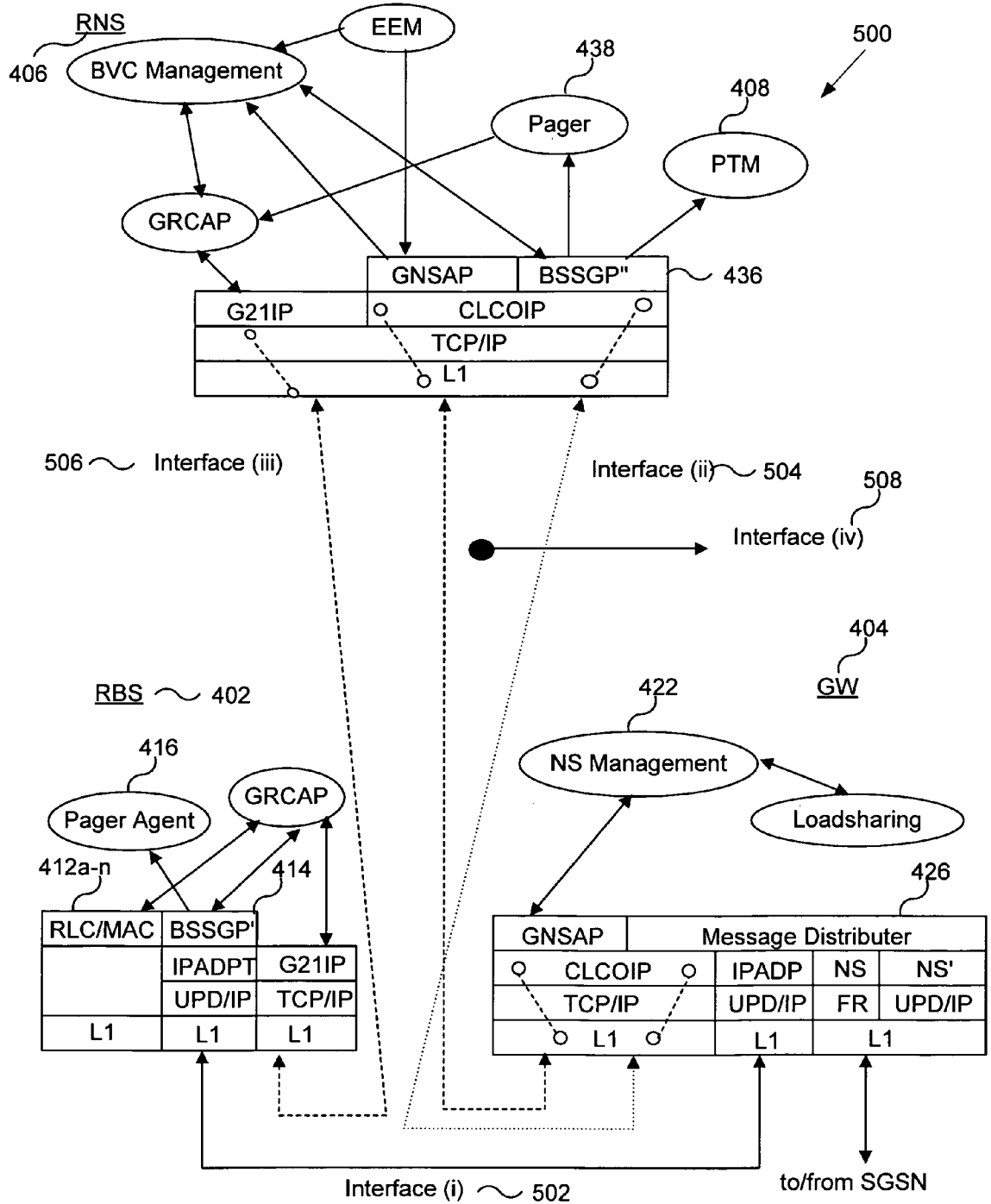
FIG. 6 is a diagram that illustrates an exemplary PCU (NSE) protocol that can be used to implement an IP-based BSS, such as, for example, BSS 400 shown in FIG. 4 or BSS 450 shown in FIG. 5, in accordance with the preferred embodiment of the present invention.

FIG. 6 is a diagram that illustrates an exemplary PCU (NSE) protocol 500 that can be used to implement an IP-based BSS, such as, for example, BSS 400 in FIG. 4 or BSS 450 in FIG. 5, in accordance with the preferred embodiment of the present invention. As such, referring to FIGS. 3–6, the BSSGP protocol for the IP-based BSS terminates in the RBS 402 or 452, and the RNS 406 or 456. An exemplary functional distribution for such a BSSGP protocol is as follows. First, note that in FIG. 6, the combination of the NS and FR is described in existing standards, the combination of NS' and UDP/IP represents the developing standard for Gb on IP, and the layer "IPADPT" is a proprietary IP ADaPTion layer.

For this exemplary embodiment, the Interface (i) 502 is implemented to realize BSSGP point-to-point payload and signalling messaging. With respect to the Interface (i) 502 shown, with flow in the direction from the GW 404 to the RBS 402, the following service primitives can be supported. The service primitive "RL-DL-UNITDATA.ind" represents the receipt by a BSS of a DL-UNITDATA PDU from an SGSN. This PDU contains an LLC-PDU and MS control information needed for transmission of the LLC-PDU across the radio air interface. The service primitive "GMM-PAGING.ind" represents the receipt by a BSS of a PAGING PS PDU or PAGING CS PDU from an SGSN. This PDU contains instructions to page an MS within a specified cell (e.g., a Point-to-Point paging message). The service primitive "GMM-RA-CAPABILITY.ind" represents the receipt by a BSS of an RA-CAPABILITY PDU from an SGSN. This PDU provides the new Radio Access capability of an MS. The service primitive "GMM-RA-CAPABILITY-UPDATE-.cnf" represents the receipt by a BSS of an RA-CAPABILITY-UPDATE-ACK PDU from an SGSN. This PDU contains the current Radio Access capabilities of an MS. The service primitive "NM-STATUS.ind" represents the receipt by a BSS of a STATUS PDU from an SGSN. This PDU indicates that an exception condition occurred within an SGSN. The service primitive "NM-FLOW-CONTROL-BVC.cnf" represents confirmation that a FLOW-CONTROL PDU has been received by an SGSN for a given BVC. The service primitive "NM-FLOW-CONTROL-MS.cnf" represents a confirmation that a FLOW-CONTROL PDU has been received by an SGSN for a given MS.

Again with respect to the Interface (i) 502 shown, but now with flow in the direction from the RBS 402 to the GW 404, the following service primitives can be supported. The service primitive "RL-UL-UNITDATA.req" represents a request to send a UL-UNITDATA PDU from a BSS to an SGSN. This PDU contains an LLC-PDU and radio air interface-derived information. The service primitive "GMM-RA-CAPABILITY-UPDATE.req" represents a request to send an RA-CAPABILITY-UPDATE PDU from a BSS to an SGSN, in order to receive the current Radio Access capabilities of an MS. The service primitive "GM-RADIO-STATUS.req" represents a request to send a RADIO-STATUS PDU from a BSS to an SGSN to report that an exception condition occurred in the operation of the radio air interface for an MS.

The service primitive "NM-FLOW-CONTROL-BVC.req" represents a request to send a FLOW-CONTROL PDU from a BSS to an SGSN. This PDU indicates the ability of a BVC to accept a certain flow of data. The service primitive "NM-FLOW-CONTROL-MS.req" represents a request to send a FLOW-CONTROL PDU from a BSS to an SGSN. This PDU indicates the ability to accept a certain flow of data for a given MS. The service primitive "NM-STATUS.req" represents a request to send a STATUS PDU from a BSS to an SGSN to report that an exception condition occurred within the BSS.

For this exemplary embodiment, the Interface (ii) is implemented to realize BSSGP non-point-to-point signalling messaging. With respect to the Interface (ii) 504 shown, in the direction from the GW 404 to the RNS 406, the following service primitives can be supported. The service primitive "GM-PAGING.ind" represents the receipt by a BSS of a PAGING PS PDU or a PAGING CS PDU from an SGSN. This PDU contains instructions to page an MS within a given group of cells. The service primitive "GM-SUSPEND.cnf" represents the receipt by a BSS of a SUSPEND-ACK PDU from an SGSN. This PDU confirms that an SGSN has marked an MS's GPRS service as suspended. The service primitive "GMM-RESUME.cnf" represents the receipt by a BSS of a RESUME-ACK PDU from an SGSN. This PDU confirms that an SGSN has marked an MS's GPRS service as resumed. The service primitive "NM-FLUSH-LL.ind" represents that upon receipt by a BSS of a FLUSH-LL PDU from an SGSN, the BSS will either delete queued LLC-PDUs for a TLLI, or move the queued LLC-PDUs from an old BVC to a new BVC. The service primitive "RL-PTM-UNITDATA.ind" represents the receipt by a BSS of an RL-UNITDATA PDU from an SGSN. The service primitive "NM-STATUS.ind" represents the receipt by a BSS of a STATUS PDU from an SGSN. This PDU indicates that an exception condition occurred within an SGSN. The service primitive "NM-BVC-BLOCK.cnf" represents the receipt by a BSS of a BVC-BLOCK-ACK PDU from an SGSN. This PDU confirms that an SGSN has marked a BVC as blocked. The service primitive "NM-BVC-UNBLOCK.cnf" represents the receipt by a BSS of a BVC-UNBLOCK-ACK PDU from an SGSN. This PDU confirms that an SGSN has marked a BVC as unblocked. The service primitive "NM-BVC-RESET.ind" represents the receipt at a BSS of a BVC-RESET PDU from an SGSN. This PDU indicates that GPRS BVC contexts have been reset at the SGSN. The service primitive "NM-BVC-RESET.cnf" represents the receipt at a BSS of a BVC-RESET-ACK PDU. This PDU confirms that a GPRS BVC context has been reset at the SGSN. The service primitive "NM-TRACE.ind" represents the receipt at a BSS of an SGSN-INVOKE-TRACE PDU from an SGSN. This PDU indicates the need to produce a trace record for an MS.

Again with respect to the Interface (ii) 504 shown, but now with flow in the direction from the RNS 406 to the GW 404, the following service primitives can be supported. The service primitive "NM-BVC-BLOCK.req" represents a request to send a BVC-BLOCK PDU from a BSS to an SGSN to mark a BVC as blocked. The service primitive "NM-BVC-UNBLOCK.req" represents a request to send a BVC-UNBLOCK PDU from a BSS to an SGSN to mark a BVC as unblocked. The service primitive "NM-BVC-RESET.req" represents a request to send a BVC-RESET PDU from a BSS to an SGSN to reset an SGSN's GPRS BVC contexts. The service primitive "NM-BVC-RESET.res" represents the sending of a BVC-RESET-ACK PDU from a BSS to an SGSN. This PDU indicates that a GPRS BVC context has been reset in the BSS.

The signalling interfaces shown in FIG. 6 are needed for PCU configuration and administration in addition to radio resource handling for packet data transfer. For example, interface (iii) 506 realizes the PCU impacts on the G21 interface, and in particular, the PCU impacts on G21(b) and G21(c). As such, G21(b) realizes cell-related configuration data, and G21(c) realizes radio signalling functionality.

For this exemplary embodiment, the Interface (iii) is implemented to realize the configuration and management functionality for packet switching in the RBS 402, and also to realize the packet switching traffic signalling messaging. With respect to the Interface (iii) 506 shown in FIG. 5, with flow in the direction from the RNS 406 to the RBS 402, exemplary PCU impacts on G21(b) are as follows. The signalling message "SET-CELL-STATUS" contains the relevant data to activate or deactivate GPRS support in a cell. The signalling message "SET-GPRS-DATA" contains the GPRS cell data which is to be updated for the specified GPRS activated cell. The signalling message "BSSGP-STATUS-UPDATE" contains the blocking status to which the specified BSSGP entity for the associated GPRS activated cell should be set. The signalling message "BSSGP-STATUS-UPDATE-ACK" acknowledges receipt of the BSSGP-STATUS-UPDATE message. The signalling message "GET-GPRS-DATA" requests specified GPRS data.

With respect to the Interface (iii) 506 shown in FIG. 6, with flow in the direction from the RBS 402 to the RNS 406, exemplary PCU impacts on G21 (b) are as follows. The signalling message "SET-CELL-STATUS-RESULT" indicates whether or not the requested cell status update is being implemented. The signalling message "GPRS-AVAILABILITY-UPDATE" indicates whether or not the specified cell supports GPRS service. The signalling message "SET-GPRS-DATA-RESULT" indicates whether or not the requested GPRS cell data update is being implemented. The signalling message "BSSGP-STATUS-UPDATE" contains the present blocking status of the specified BSSGP entity for the associated GPRS activated cell. The signalling message "BSSGP-STATUS-UPDATE-ACK" acknowledges receipt of the BSSGP-STATUS-UPDATE message. The signalling message "GET-GPRS-DATA-RESULT" returns the outcome of the specified GPRS data request.

Again with respect to the Interface (iii) 506 shown in FIG. 6, with flow in the direction from the RNS 406 to the RBS 402, exemplary PCU impacts on G21(c) are as follows. The signalling message "MS-GPRS-SERVICE-CNF" confirms the specified MS's current GPRS service status (e.g., suspended or resumed). The signalling message "PDCH-ALLOCATION-RESULT" contains the outcome of the PDCH allocation request. The signalling message "REQUEST-PDCH-PREEMPTION" requests that an On-Demand PDCH in the specified cell be released. The signalling message "CANCEL-PDCH-PREEMPTION" requests that the specified PDCH preemption attempt be cancelled. The signalling message "FLUSH-IND" requests that the queued LLC-PDUs for a TLLI either be deleted or moved from the old BVC to a specified new BVC. The signalling message "PAGE-MS" contains the required data to page a mobile in a single cell or specified group of cells. Preferably, for this message, a specified group of cells will be targeted for paging if a Paging Agent (e.g., 416) is located in the RBS. The signalling message "PDCH-ACTIVATION-RESULT" contains the outcome of the PDCH activation request. Note that the functionality contained in this message can be implemented internally in the RBS 402. If this is the case, then the Channel Description Data and Mobile Allocation Data can be retrieved by another message. The signalling message "REQUEST-PDCH" requests PDCH resources for packet transfers. Note that the functionality contained in this message can be implemented internally in the RBS 402. The signalling message "IMM-ASSIGN-SENT" acknowledges the sending of an Immediate Assignment Command to the MS that requested the PDCH. Note that the functionality contained in this message can be implemented internally in the RBS 402. The signalling message "REQUEST-PDCH-RELEASE" requests that the specified PDCH be released. Note that the functionality contained in this message can also be implemented internally in the RBS.

For this exemplary embodiment, the following messages can be routed from the RNS 406 to the GW 404, and from the GW 404 to an SGSN via G21 (c). The service primitive "GMM-SUSPEND.req" represents a request to send a SUSPEND PDU from a BSS to an SGSN to mark an MS's GPRS service as suspended. The service primitive "GMM-RESUME.req" represents a request to send a RESUME PDU from a BSS to an SGSN to mark an MS's GPRS service as resumed. The service primitive "NM-FLUSH-LL.res" represents the sending of a FLUSH-LL-ACK PDU from a BSS to an SGSN to report if queued LLC-PDU(s) for an MS were deleted or transferred from the old to the new cell within the NSE. The service primitive "NM-LLC-DISCARDED.req" represents a request to send an LLC-DISCARDED PDU from a BSS to an SGSN. This PDU indicates that LLC frames pertaining to an MS have been locally discarded.

With respect to the Interface (iii) 506 shown in FIG. 6, with flow in the direction from the RBS 402 to the RNS 406, exemplary PCU impacts on G21 (c) are as follows. The signalling message "MPDCH-STATUS-UPDATE" indicates whether or not the specified GPRS activated cell has a configured Master PDCH. The signalling message "PDCH-PREEMPTION-RESULT" contains the outcome of the PDCH preemption request. The signalling message "ALLOCATE-PDCH" requests the allocation of channel resources for packet data transfer. Depending on the system type parameter (e.g., GPRS only or combined) contained in the Set Cell Status message, all channel resources in a cell can be allocated as fixed PDCHs. The signalling message "ACTIVATE-PDCH" requests activation of the specified PDCH. Note that the functionality contained in this message can be implemented internally in the RBS 402. The signaling message "IMM-ASSIGN-CMD" initiates the sending of an Immediate Assignment Command to the MS that requested the PDCH. Note that the functionality contained in this message can be implemented internally in the RBS 402. The signalling message "RELEASE-PDCH" initiates an RF Channel Release. Note that the functionality contained in this message can be implemented internally in the RBS 402.

For this exemplary embodiment, the Interface (iv) 508 shown in FIG. 6 describes the preferred functionality between the RNS and GW nodes for realizing Network Service configuration and management. The Interface (iv) also realizes the Message Distributor configuration and management functionality. With respect to the Interface (iv) 508 shown in FIG. 6, with flow in the direction from the RNS 406 to the GW 404, the message "CONFIGURE-NS" requests the configuration of a network service entity either for Gb over UDP/IP or Gb on FR. The message "MESSAGE-DISTRIBUTOR-UPDATE" contains the Payload-Port/IP Address in the associated RBS for a cell specified by its NSEI and BVCI. The message "NS-STATUS-UPDATE-ACK" acknowledges receipt of the NS-STATUS-UPDATE message.

With respect to the Interface (iii) 506 shown in FIG. 6, but with flow in the direction from the GW 404 to the RNS 406, the message "CONFIGURE-NS-ACK" acknowledges the NS configuration request. The message "MESSAGE-DISTRIBUTOR-UPDATE-ACK" acknowledges the Message Distributor Update request. The message "NS-STATUS-UPDATE" contains the current status of the network service layer. This message contains the Port/IP address on the downlink side of the GW node specified network service entity.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A network service entity for a base station system, comprising:
   at least one point-to-point functional unit;
   a signalling function unit; and
   a message distributor unit, said message distributor unit coupled to said at least one point-to-point functional unit, said signalling function unit, and a connection interface, said message distributor unit operable to distribute packet information to or from said connection interface and to route BSS GPRS Protocol Virtual Connections Identifier (BVCI) based BSS GPRS Protocol (BSSGP) packets.

2. The network service entity of claim 1, further comprising:
   a point-to-multipoint functional entity coupled to said message distributor unit.

3. The network service entity of claim 1, wherein the base station system comprises an IP-based base station system.

4. The network service entity of claim 1, wherein said signalling functional unit comprises a BVC signalling functional unit.

5. The network service entity of claim 1, wherein said network service entity comprises a PCU.

6. The network service entity of claim 1, wherein said packet information comprises GPRS data.

7. The network service entity of claim 1, wherein said packet information comprises EDGE GPRS data.

8. The network service entity of claim 1, wherein said connection interface comprises a Gb interface.

9. The network service entity of claim 1, wherein said at least one point-to-point functional unit includes an RLC/MAC control unit.

10. The network service entity of claim 1, wherein said at least one point-to-point functional unit is coupled to a radio air interface.

11. The network service entity of claim 1, wherein said message distributor unit is operable to build a BVCI-to-IP address/port relationship table using a plug 'n play application.

12. A node for a base station system, comprising:
    at least one point-to-point functional unit;
    a signaling function unit; and
    a message distributor unit coupled to a connection interface, a point-to-multipoint functional unit and said signaling function unit, said message distributor unit operable to distribute packet information to a plurality of network units and to route BVCI-based BSSGP packets via said connection interface.

13. A method for controlling network service functions in a base station system, consisting the steps of:
    controlling a connection for conveying data between at least two endpoints in said base station system;
    controlling a connection for conveying said data between at least a third endpoint and said at least two endpoints in said base station system;
    controlling at least one connection for conveying signalling information in said base station system; and
    distributing said data to or from a connection interface including routing BVCI-based BSSGP packets to or from a Gb interface.

14. The method of claim 13, wherein the base station system comprises an IP-based base station system.

15. The method of claim 13, wherein said signalling information comprises BVC signalling information.

16. The method of claim 13, wherein said network service functions reside in a PCU.

17. The method of claim 13, wherein said data comprises GPRS packet data.

18. The method of claim 13, wherein said data comprises EDGE GPRS data.

19. The method of claim 13, wherein said connection interface comprises a Gb interface.

20. The method of claim 13, further comprising the step of using a plug 'n play application to build a BVCI-to-IP address/port relationship table.

21. The node of claim 12, the message distribution unit further operable to build a BVCI-to-IP address/port relationship table using a plug 'n play application.

* * * * *

UNITED STATES PATENT AND TRADEMARK OFFICE
CERTIFICATE OF CORRECTION

PATENT NO.       : 6,996,092 B1
APPLICATION NO.  : 09/686502
DATED            : February 7, 2006
INVENTOR(S)      : Maguire et al.

It is certified that error appears in the above-identified patent and that said Letters Patent is hereby corrected as shown below:

In Column 14, Line 24, in Claim 13, delete "consisting" and insert -- comprising --, therefor.

Signed and Sealed this

Twenty-seventh Day of November, 2007

JON W. DUDAS
*Director of the United States Patent and Trademark Office*